May 3, 1932.    C. N. MONTEITH    1,856,778
TAIL WHEEL FOR AIRCRAFT
Filed Jan. 6, 1930
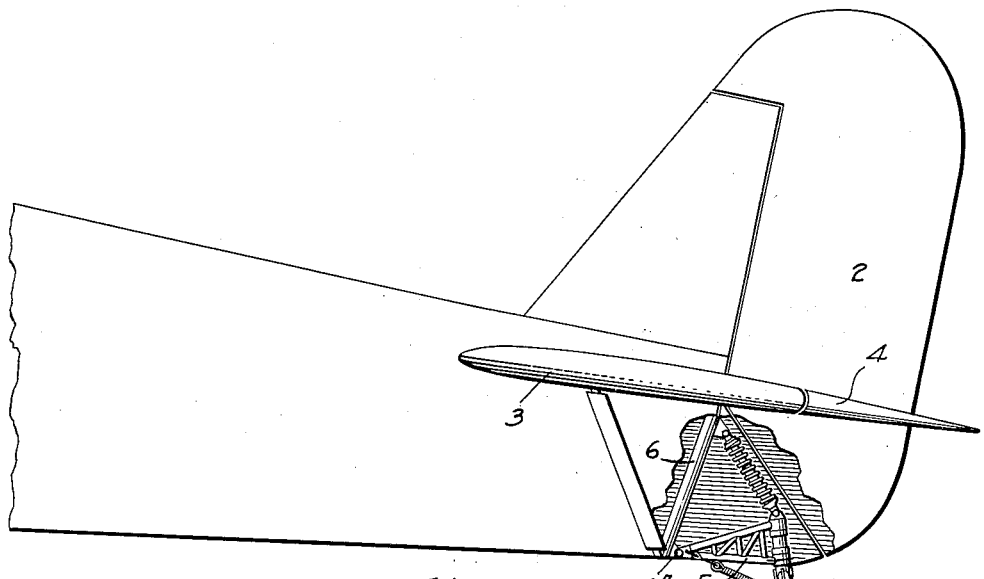
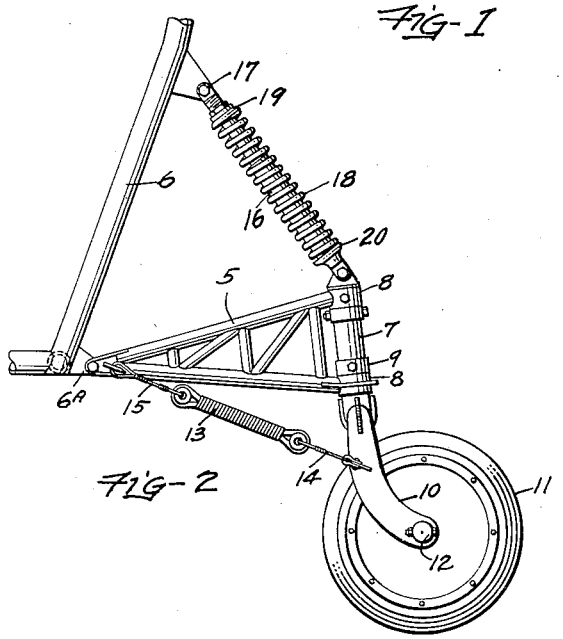
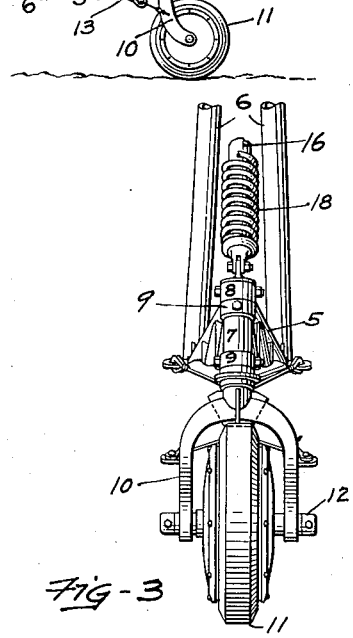
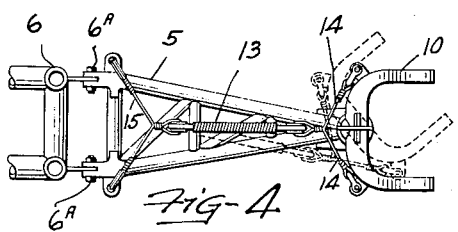
INVENTOR
Charles Norton Monteith Patented May 3, 1932

1,856,778

UNITED STATES PATENT OFFICE

CHARLES NORTON MONTEITH, OF SEATTLE, WASHINGTON, ASSIGNOR TO BOEING AIRPLANE COMPANY, OF SEATTLE, WASHINGTON

TAIL WHEEL FOR AIRCRAFT

Application filed January 6, 1930. Serial No. 418,957.

This invention relates to improvements in tail wheels for airplanes, and has for its principal object to provide a novel structure of unusual strength and rigidity for swingably and yieldingly supporting a tail wheel.

Another object of the invention is the provision of a centering means for normally holding the wheel in alignment with the longitudinal axis of the airplane.

It is especially desirable that the tail wheel be mounted in a light rigid structure for strength, in such manner that it will automatically assume a position in a fore-and-aft plane while in flight, to minimize drag, yet that it be easily deflected to permit steering while taxiing, and with all this, that there be associated with it a shock absorber, since heavy planes of large capacity require the same in landing. The nature of the tail wheel mounting and the limitations of space preclude the direct inclusion of a shock absorber, and the other considerations mentioned have heretofore operated to prevent the effective employment of a shock absorber in an assembly having the advantages set forth. It is my object, therefore, to provide an assembly of this nature wherein all of the advantageous features may be included.

These and other objects of the invention will appear as it is more fully hereinafter described in the specification, illustrated in the accompanying drawings, and finally pointed out in the appended claims.

In the drawings:

Figure 1 is a fragmentary side elevation of an airplane with my improved form of tail wheel structure attached thereto.

Figure 2 is an enlarged detail view.

Figure 3 is an end elevation of Figure 2.

Figure 4 is a plan view of Figure 2.

Referring now more particularly to the drawings:

Reference numeral 1 indicates the fuselage of an airplane having the usual tail surfaces which consist of a rudder 2, stabilizer 3 and elevators 4.

A structure 5 of double wedge shape formation, is swingably mounted in a vertical plane to the tail post 6 of the fuselage by means of bolts 6a. The outermost end of the structure 5 pivotally supports a shaft 7 by means of collars 8 and retaining rings 9. The lower end of the shaft 7 is formed into a fork 10 to rotatably carry a wheel 11 by means of an axle 12 which is secured to the fork in any suitable manner. This forms a light, strong assembly which has a broad base at its forward end, to prevent lateral movement relative to the fuselage, yet permitting vertical movement, and freely permitting lateral movement of the wheel 11 as a caster as the airplane changes direction while taxiing.

A resilient member 13 is interposed between the fork and the inner end of the structure 5. One end of the resilient member is secured to a bridle 14 which connects at both of its ends with the fork. The opposite end of the resilient member connects with a bridle 15 which connects with the structure 5, as shown. The object of the bridles with the resilient member between them is to hold the wheel in alignment with the longitudinal axis of the airplane while in flight so that the air resistance of the wheel will be reduced to a minimum. This same means also keeps the wheel in a proper position for contact with the ground when coming in to land.

Attached to the upper end of the shaft 7 is one end of a shock absorbing unit 16. The opposite end of the shock absorber is attached to the tail post as at 17. Surrounding the shock absorber is a compression spring 18 whose ends engage with cup-like members 19 and 20 which are secured to the shock absorber. The spring is adapted for absorbing ordinary shocks caused by the wheel passing over irregularities in the surface of the ground, while the shock absorber is adapted for absorbing the first shock or shocks of impact with the ground in landing.

Since the structure 5 is broad at its base—its forward end, it is braced against lateral deflection, yet lateral deflection of the wheel is rendered possible. The broad base being pivoted to the fuselage, the structure 5 and the wheel 11 supported thereby may move vertically, and the shock absorber may be securely fastened to the tail post 6, and to the outer end of the structure 5, yet it permits the yielding movement of the wheel in a vertical plane so necessary in landing, without interfering with its lateral deflection or automatic realignment.

While I have shown a particular form of embodiment of my invention, I am aware that many minor changes therein will readily suggest themselves to others skilled in the art without departing from the spirit and scope of the invention.

Having thus described the invention, what I claim as new and desire to protect by Letters Patent, is:—

1. A device of the class described comprising a wheel pivotally mounted to a double wedge shape member, said member being swingably and yieldingly mounted to the fuselage of an airplane, a bridle attached to the double wedge shape member and another bridle attached to the supporting fork for the wheel, a resilient means interconnecting both bridles for keeping said wheel in alignment with said double wedge shape member.

2. A tail wheel assembly for airplanes comprising, in combination with a fuselage terminating in a tail post, a structure having a broad base at its forward end, means pivotally supporting said structure at its base upon the fuselage at the base of said tail post, a shock absorber extending between the swinging end of said structure and the tail post, spaced from said pivotal support, a tail wheel, and an upright shaft journaled in the swinging end of said structure and supporting said tail wheel for rotation in a normally longitudinal vertical plane.

3. A tail wheel assembly for airplanes comprising, in combination with a fuselage terminating in a tail post, a structure having a broad base at its forward end, means pivotally supporting said structure at its base upon the tail post of the fuselage, a shock absorber extending between the swinging end of said structure and the tail post, spaced from said pivotal support, a tail wheel, and an upright shaft journaled in the swinging end of said structure and supporting said tail wheel for rotation in a normally longitudinal vertical plane, and yieldable means connected to each side of the shaft, at a point laterally spaced from its axis, and extending forward to connect with said structure, to maintain said wheel, when otherwise unrestrained in its normal longitudinal plane.

4. In combination with an airplane fuselage, a structure pivotally supported from the fuselage upon a horizontal transverse axis, means yieldable to permit swinging of said structure in a vertical plane, a tail wheel, an upright shaft journaled in the swinging end of said structure and supporting said wheel for rotation in a vertical plane, the shaft being forked at its lower end to support the wheel, and yieldable means comprising a bridle secured to each side of said fork, and to the structure mentioned, and including a spring between the connections at the fork and at the structure.

5. The combination of claim 4, the fuselage terminating in a tail post, and the first-mentioned yieldable means comprising a shock absorber connected at its lower end to the structure mentioned, substantially above the upper end of the shaft, and extending generally upwarding and forwardly to a connection with the tail post.

6. The combination of claim 4, the fuselage terminating in a tail post, and the first-mentioned yieldable means comprising a shock absorber connected at its lower end to the structure mentioned, substantially above the upper end of the shaft, and extending generally upwardly and forwardly to a connection with the tail post, the shaft being forked at its lower end to support the wheel, and the last-mentioned yieldable means comprising a bridle secured to each side of said fork, and to the structure mentioned, and including a spring between the connections at the fork and at the structure.

7. A tail wheel assembly, comprising a truss member of double wedge conformation having a broad base at its forward end, a shock absorber extending upwardly from its rearward end, a tail wheel, and a shaft extending upwardly therefrom and journaled in the rearward end of said truss member, to support the tail wheel for rotation in a normally longitudinal vertical plane, and yieldable means connected to each side of the shaft, at a point laterally spaced from its axis, and extending forward to connect with said truss member, to maintain said wheel, when otherwise unrestrained, in its normal longitudinal plane, said assembly being adapted for attachment to an airplane fuselage at two pivotal points in spaced relation, the first comprising horizontal pivoting bolts connecting the forward end of said truss member to the bottom of the tail post, and the second connecting the upper end of said shock absorber to an upper lug on the tail post.

In testimony whereof I affix my signature.

CHARLES N. MONTEITH.